E. C. BRANDUM.
PISTON RING.
APPLICATION FILED APR. 14, 1917.
1,251,630.
Patented Jan. 1, 1918.
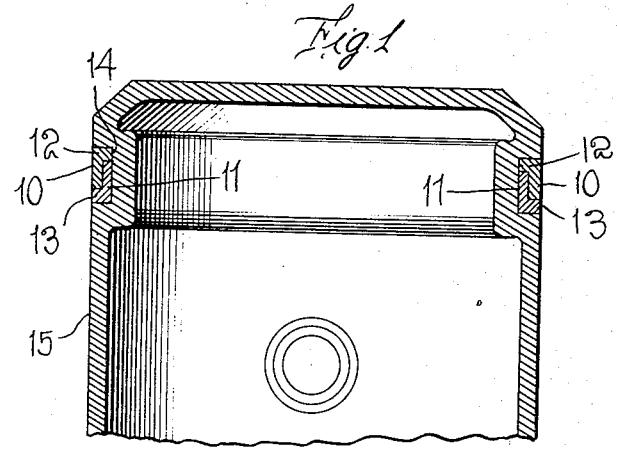
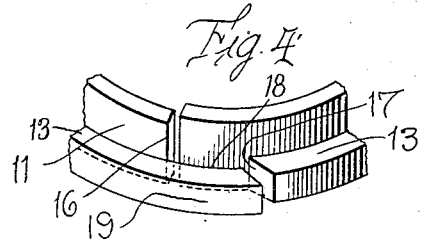
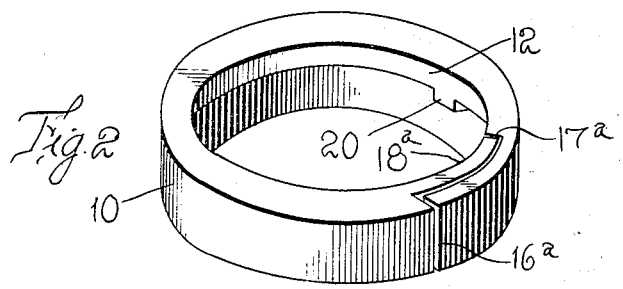
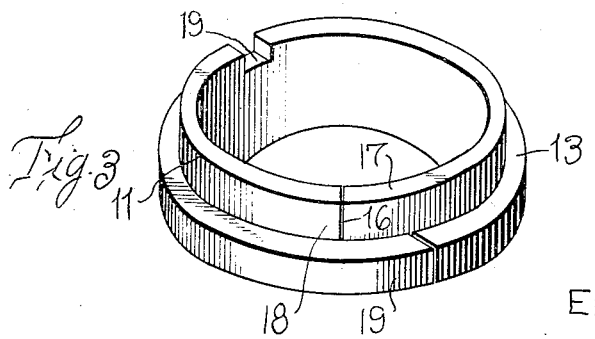
Inventor
EMMET C. BRANDUM
By Watson E. Coleman
Attorney

UNITED STATES PATENT OFFICE.

EMMET C. BRANDUM, OF FRAZEE, MINNESOTA.

PISTON-RING.

1,251,630.  Specification of Letters Patent.  Patented Jan. 1, 1918.

Application filed April 14, 1917. Serial No. 162,098.

*To all whom it may concern:*

Be it known that I, EMMET C. BRANDUM, a citizen of the United States, residing at Frazee, in the county of Becker and State of Minnesota, have invented certain new and useful Improvements in Piston-Rings, of which the following is a specification, reference being had to the accompanying drawings.

This invention relates to pistons, and particularly to piston rings therefor.

The general object of my invention is to provide a piston ring of very simple construction, and formed of two sections, each of said sections being split, and provide means whereby the two sections of the piston ring are so disposed that the splits in the sections will not coincide and provide means for holding the sections in this relation, thereby securing a more uniform wear on the piston rings and on the wall of the cylinder, and further securing a better fit between the piston rings and the wall of the cylinder.

A further object is to provide a construction of this character in which the compound piston ring formed of the two sections, as heretofore described, may rotate within the piston ring groove, but the sections will be held from such rotation and the splits in the sections will break joints with each other.

A further object is to provide a piston ring of this character in which the sections are held from relative rotation, without the use of dolly pins, or like devices.

A further object is to provide piston rings, which are so constructed as to retain compression in an internal combustion engine better than ordinary piston rings will do.

Other objects will appear in the course of the following description.

My invention is illustrated in the accompanying drawings, wherein:—

Figure 1 is a fragmentary vertical sectional view through a piston provided with my improved piston rings;

Fig. 2 is a perspective view of one of the ring sections;

Fig. 3 is a perspective view of a coacting ring section;

Fig. 4 is a fragmental perspective view between one of the ring sections.

Referring to the drawings, it will be seen that my piston ring consists of two sections 10 and 11. One of these sections, as for instance, the section 10 is provided at one margin with an inwardly projecting flange 12, while the other section, as for instance the section 11, is provided at its opposite margin with an outwardly projecting flange 13. Thus the section 10, for instance, fits over and surrounds the section 11 and abuts against the inner face of the flange 13, while the inner end of the section 11 abuts against the inner face of the flange 12. It will, of course, be understood that the outer faces of the two sections are flush with each other and the inner faces of the two sections are flush, and that both of said sections are made of resilient metal, in the usual manner of piston rings, and fit within a piston ring groove 14 in the piston 15 in the usual manner.

The section 11 is split at one point, as at 16, this split extending downward from the upper edge to the lower edge of the section 11, but not extending through the flange 13. The flange 13 is split or has an inwardly extending kerf at 17, which extends inward to a point in line with the outer face of the body 11, that portion of the inwardly extending flange 13 between the kerf or split 17 and the kerf or split 16 being cut away from the body of the section by a circumferentially extending kerf 18, thus leaving the flange formed with a tongue 19, which overlaps the end of the section 11, so that the split 17 in the flange is out of alinement with the split or kerf 16 of the body of the section.

The section 10 is constructed in the same manner. The body of the section is split, as at 16ª, the flange is split as at 17ª and there is a kerf 18ª which extends circumferentially between the flange 12 and the body of the section 10.

For the purpose of preventing the relative rotation of the ring sections upon each other, I form one of these sections, as for instance the section 11, with a notch or recess 19 in its upper edge and form the opposite section, as for instance the section 10, with the lug 20, which extends from the flange 12 and which is adapted to engage in the recess 19. When the lug 20 is in engagement with the recess 19, the sections are so held that the split 16 of one section will be in diametrically opposite relation with the split 16ª of the other section and the split 17 of one flange will be in diametrically opposite relation with the split 17ª of the other flange. This prevents any relative rotation of the ring sections upon each other and allows of a more equal expansion of the rings than would be possible where the splits or kerfs, either intentionally or accidentally, come in alinement or in contiguity.

As a consequence, of providing a piston ring in two sections, the splits of which are held in diametrically opposite relation, the outward pressure of the rings is more uniform and this prevents the piston from "slapping." Furthermore, the sections can be more readily tensioned than where the piston ring is formed in one piece and again with the two section piston ring, the splits of which are held from alinement with each other, the pressure within the cylinder is retained and lubricating oil is prevented from passing into the firing chamber of the piston, where the latter is used on internal combustion engines.

Having described my invention, what I claim is:—

1. As an article of manufacture, a piston ring made in two mating annular sections, each section being split at one point, one section having an outwardly extending marginal flange, the other having an inwardly extending marginal flange, the body of one section having sliding engagement over the body of the other section, with the flanges abutting against the adjacent ends of said body portions, the flanges on each section being split at a distance remote from the split in the body of the section and there being a kerf extending from the split in the body of the section for a distance along the flange to the split in the flange, to thereby provide a tongue on the flange extending over the body of the section, and means on the sections holding them from relative rotation.

2. As an article of manufacture, a piston ring made in two mating annular sections, each section being split at one point, one section having an outwardly extending marginal flange, the other having an inwardly extending marginal flange, the body of one section having sliding engagement over the body of the other section, with the flanges abutting against the adjacent ends of said body portion, the flanges on each section being split at a distance remote from the split in the body of the section, and there being a kerf extending from the split in the body of the section for a distance along the flange to the split in the flange to thereby provide a tongue on the flange extending over the body of the section, and means on the sections holding the sections in such relation that the splits in the bodies of the sections and in the flanges are diametrically opposite.

3. A piston having a piston ring groove, and a piston ring disposed in said groove and composed of two mating sections, each of said sections being formed with a body portion and a flange, the body portion of one section fitting over and having sliding engagement with the body portion of the other section, each of said sections being split at one point and each flange being split at a point remote from the split in the body of the section and being connected to said last named split by a kerf extending between the flange and the body of the section to thereby provide a lapped joint in each section, one of the sections being provided with a lug and the other with a recess into which the lug engages, whereby to hold these recesses with their split points in diametrically opposite relation.

In testimony whereof I hereunto affix my signature in the presence of two witnesses.

EMMET C. BRANDUM.

Witnesses:
J. H. SCHNEIDER,
H. DIEKMANN.